United States Patent [19]

Fung

[11] Patent Number: 4,811,204
[45] Date of Patent: Mar. 7, 1989

[54] DIRECT MEMORY ACCESS AND DISPLAY SYSTEM

[75] Inventor: Henry T. Fung, San Jose, Calif.

[73] Assignee: Vadem Corporation, Milpitas, Calif.

[21] Appl. No.: 641,785

[22] Filed: Aug. 16, 1984

[51] Int. Cl.[4] .......................... G06F 1/04; G09G 1/00
[52] U.S. Cl. ..................................... 364/200; 364/900
[58] Field of Search ... 364/200 MS File, 900 MS File; 340/799

[56] References Cited

U.S. PATENT DOCUMENTS

| | | | |
|---|---|---|---|
| 4,156,904 | 5/1979 | Minowa et al. | 364/200 |
| 4,181,933 | 1/1980 | Benysek | 364/200 |
| 4,257,095 | 3/1981 | Nadir | 364/200 |
| 4,263,648 | 4/1981 | Stafford et al. | 364/200 |
| 4,373,183 | 2/1983 | Means et al. | 364/200 |
| 4,403,303 | 9/1983 | Howes et al. | 364/900 |
| 4,414,645 | 11/1983 | Ryan et al. | 364/900 |
| 4,417,334 | 11/1983 | Gunderson et al. | 364/200 |
| 4,418,343 | 11/1983 | Ryan et al. | 340/799 |
| 4,462,028 | 7/1984 | Ryan et al. | 340/799 |
| 4,511,965 | 4/1985 | Rajaram | 364/200 |
| 4,535,330 | 8/1985 | Carey et al. | 364/900 |
| 4,556,879 | 12/1985 | Tanaka | 340/799 |
| 4,558,412 | 12/1985 | Inoshita et al. | 364/200 |

Primary Examiner—Thomas M. Heckler
Assistant Examiner—Viet Q. Nguyen
Attorney, Agent, or Firm—Fliesler, Dubb, Meyer & Lovejoy

[57] ABSTRACT

A data processing system including a central processing unit which connects to two or more buses. The buses include a memory bus connected to a main store, and to two or more I/O devices sharing common control for accesses to the main store. Priority of transfers over the memory bus is determined by priority circuit in a two-way priority between the processing unit and the common I/O devices on the memory bus. One common I/O devices is a display unit and the other common I/O device is a direct memory access disk unit. The display is periodically refreshed. Priority is always granted to the display device. Priority is granted to the disk device as a supplement to a access by the display device. The direct memory access device piggybacks on the priority of the display device.

5 Claims, 4 Drawing Sheets

DIRECT MEMORY ACCESS AND DISPLAY SYSTEM

BACKGROUND OF THE INVENTION

The present invention relates to the field of data processing systems and more particularly to architectures in small systems.

Since introduction of the IBM Personal Computer in 1981, there has been an increasing interest in small systems. Typically, the small system includes a system unit, including a central processor and main storage, and includes various input/output (I/O) units such as a keyboard, a display, a printer and a disk memory.

Small systems, like large systems, are under the control of software in various forms. The paramount control is the operating system (OS) which functions as the interface between application programs and the hardware. The portion of the software concerned with I/O devices is known as the basic input/output system (BIOS).

The BIOS typically includes self-test routines, device-handling routines, and system-service routines. The self-test routines are diagnostic instructions that are executed to ensure the correct operation and reliability of the system. The device handling routines coordinate and enable the functioning of input/output devices. Each I/O device includes a corresponding device-handling routine. Each routine consists of instructions for a specific set of functions for the I/O device including checking to see if the device is ready, causing data to be transferred from and to the device, and verifying the proper completion of the data transfer operation.

The system service routines provide essential services for the system such as loading, memory size determination, equipment determination, time-of-day, and print-screen functions.

In many systems, each I/O device includes a device controller. For example, a display unit typically includes a display controller, a disk unit includes a disk controller and when direct memory access (DMA) is employed, a DMA controller is provided.

In small systems, usually all of the I/O devices connect to a common I/O bus. Only one device at a time has access to the common bus.

Typically, direct memory access (DMA) is performed, a disk unit requiring a transfer to the system sends a request to the disk controller. The disk controller in turn sends a request to the DMA circuitry which in turn sends a request to the central processor. The central processor then returns an acknowledge signal to the DMA controller. At the same time that the acknowledge is sent to the DMA controller, the central processor stops all other activity on the bus. At that point in time, the DMA controller completes the direct memory access without any further involvement of the central processor. In small systems with only a single memory bus, the processor remains idle during DMA transfers.

The reason that the central processor gives up control to the DMA controller is to increase the speed of memory accesses. The DMA controller is capable of executing the control commands much faster then if the central processor since the central processor must execute a plurality of time-consuming instructions to achieve the same control function. Effectively the DMA controller is a co-processor specializing in making direct memory accesses.

The typical processing steps for communication between the central processor system and a disk, involve execution by the central processor of an I/O instruction. When the I/O instruction is decoded, a command is issued which will initiate operations with the I/O device. Typically, two types of commands are employed, a read command and a write command. Either the read command or the write command is issued to the disk controller. When the disk controller has a disk ready signal, the disk controller initiates the DMA request to the DMA control circuitry. The previous description of what happens when a disk controller requests a DMA operation was described above. After the DMA operation is completed, the disk controller signals completion by sending a transfer complete signal to the central processor. At that time, the central processor again commences executing instructions.

The difficulty with the conventional DMA circuitry is that substantial wasted time occurs during the period when the DMA requests are transmitted to the central processor and the central processor stops activity on the bus. For each DMA request, typical systems waste 30% of the time in making the DMA handshake.

In order to avoid this wasted time, there is a need for an improved system which more efficiently handles DMA requests.

Additionally there is a need for improved systems which require fewer components without need for a different controller for every I/O device.

In data processing systems, employing common buses, a priority scheme must be employed to determine which device will gain access to the bus when there is contention for bus access by more than one device. Many priority schemes have been employed for resolving contention among competing devices. In small systems, with only one I/O bus, only one device can gain priority to the bus at any given time. Frequently, the central processing unit is given lowest priority so that when direct memory access occurs between a disk and main storage, for example, when the central processing unit sits idle. It is desirable, even in small systems, to permit the central processing unit to perform useful functions even when priority or access to one bus in the system has been allocated to another device.

In small scale systems, elaborate priority schemes are usually not cost justified and therefore there is a need for an improved, a simple priority scheme which keeps the cost of resolving contentions among competing devices to a simple and economical level.

SUMMARY OF THE INVENTION

The present invention is a data processing system including a central processing unit. The central processing unit connects to two or more buses. The buses include a memory bus connected to a main store, and to two or more I/O devices sharing common control for accesses to the main store.

Another one of the buses is an I/O bus where other input/output devices communicate with the processing unit. Priority of transfers over the memory bus is determined by priority means in a two-way priority between the processing unit and the common I/O devices on the memory bus.

In one particular embodiment, one of the common I/O devices is a display unit and the other common I/O device is a direct memory access disk unit. The display is periodically refreshed by periodically accessing locations in the main store. Priority is always granted to the display device and any attempted priority by the processing unit when the display device is to be active causes the attempted access by the processing unit to be aborted. Priority is granted to the disk device for a direct memory access as a supplement to a access by the display device. Accordingly, no separate priority is required for the direct memory access device since it piggybacks on the priority of the display device. With the piggyback priority of the DMA on top of the display priority, only a two-way priority scheme is required, that is, priority between the processing unit and the display or the display as extended by the DMA.

Since the main store and the common I/O devices all connect on a single bus, the processing unit is free to communicate with other buses in the system whenever the common I/O devices and the main store are communicating on the memory bus.

In one embodiment of the invention, a third bus with additional memory within the address space of the processing unit is included. For example, non-volitile read-only memory and non-volitile random access memory are included. The processing unit can communicate with the ROM or the RAM even though the main store is communicating with other devices on the memory bus.

In accordance with the above summary of the invention, the present invention achieves an improved, low-cost system.

Additional objects and features of the invention will appear from the following description in which the preferred embodiments of the invention have been set forth in detail in conjunction with the drawings.

DETAILED DESCRIPTION

Figure 1:
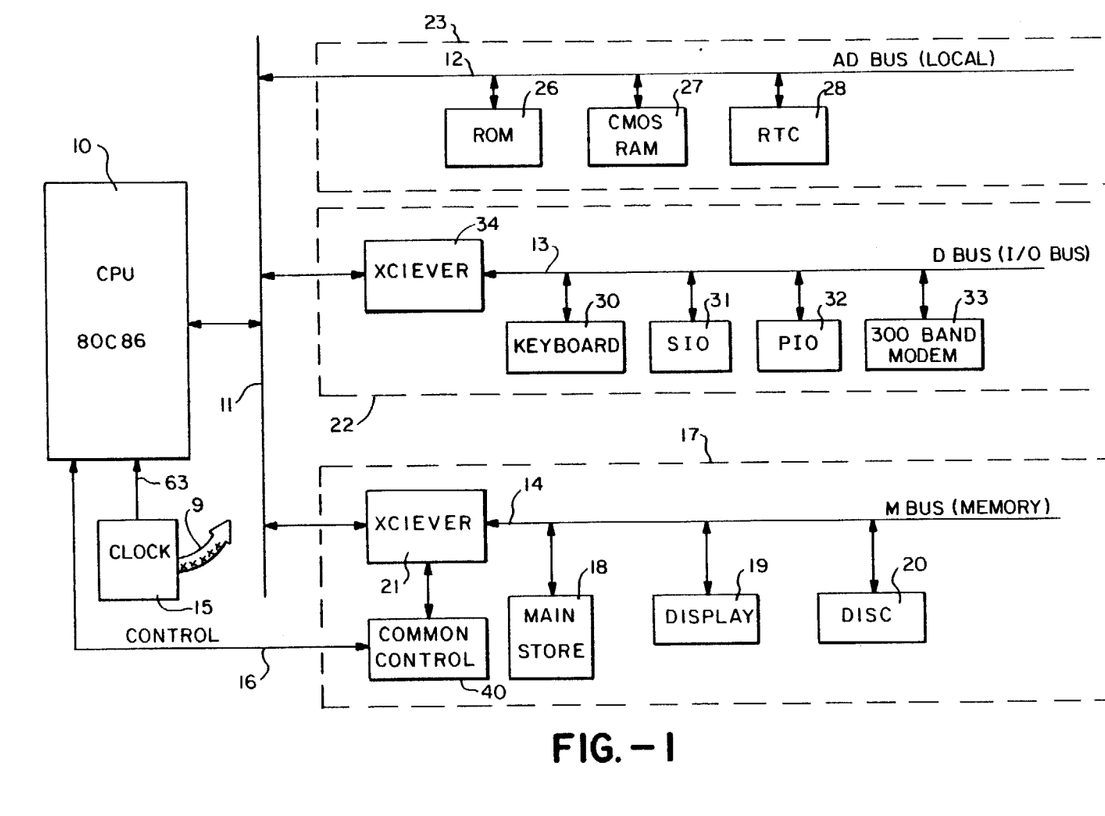
FIG. 1 depicts an overall block diagram of a data processing system in accordance with the present invention.

In FIG. 1, a block diagram of a general purpose computer in accordance with the present invention is shown. The computer of FIG. 1 is a small-scale computer, frequently called a personal computer (PC) which for a relatively low cost provides substantial processing power.

In FIG. 1, the computer includes a central processing unit 10, such as a well-known 80C86 processor manufactured by Intel. The processor 10 connects to other parts of a system with a CPU bus 11. The bus 11 connects to a local bus unit 23, an I/O bus unit 22 and a memory bus unit 17.

The local bus unit 23 includes a read only memory (ROM) 26, a non-volatile random access memory 27 (RAM) and a real time clock 28. The memorys 26 and 27 store data regardless of whether or not the power in the system of FIG. 1 is on or off. Typically, the ROM 26 stores up to 64K bytes of information, and the memory 27 stores up to 16K bytes of information. The real time clock 28 stores the date, day and time of day regardless of whether the power is on in the system or not. The units 26, 27, and 28 connect to the AD bus 12, which in the embodiment shown, is a direct extention of the processor bus 11.

In FIG. 1, the I/O bus unit 22 includes a transceiver 34 which latches data and addresses which are transmitted between bus 11 of the processing unit 10 and the D bus 13. The bus 13 connects to standard input/output devices including a keyboard 30, a serial input/output port 31, a parallel input/output port 32 and a modem 33. The processor bus 11 also connects to the memory bus unit 17. The memory bus unit 17 includes a transceiver 21 which connects bus 11 to the M bus 14. Bus 14 includes address, data and control information and connects to the main store 18, a display unit 19 and a disk unit 20. The processor 10 connects to the memory bus unit 17 with control lines 16. In FIG. 1, the clock unit 15 generates a number of clock signals which are used to time the processor 10 and the bus units 17, 22 and 23.

The address space of the memory within the system in FIG. 1 is organized with different addresses for different devices. In an embodiment where a million bytes of data are within the address space, the main store 18 includes up to one-half million bytes, that is, with a hexadecimal address range 00000to80000. The ROM memory 26 is located at the highest order location, for example, at address locations hexadecimal FC000toFFFFF. The RAM memory 27 is located at the address space, for example, F8000toFC000. The address space between 80000 and F8000 is unused in the example described.

With this address space allocation, and with the different busses 12, 13 and 14, the processing unit 10 can communicate with certain units which have certain address locations within the address space while other units within the system are active with different units at different locations of the address space. More specifically, the memory bus unit 17 operates to communicate with the main store 18 for displaying information on the display unit 19 or for making transfers between main store 18 and the disk unit 20 independently of the operation of the processing unit 10.

The display 19 has bit-mapped display locations in main store which are regularly addressed and transmitted for display in display 19. Similarly, the disk unit 20 is capable of direct memory access operation which is independent of the operation of the processor 10. These activities of the display 19 and the disk unit 20 can occur while the CPU is communicating with the I/O bus unit 22 or the local bus unit 23. Whenever the processor 10 attempts to communicate with the memory unit 17, control circuitry is provided for assuring that the display unit 19 or the disk unit 20 has priority over access by the processor unit 10 to the memory bus 14. Further details of the operation of the memory bus unit 17 are described in connection with FIG. 2.

Figure 2:
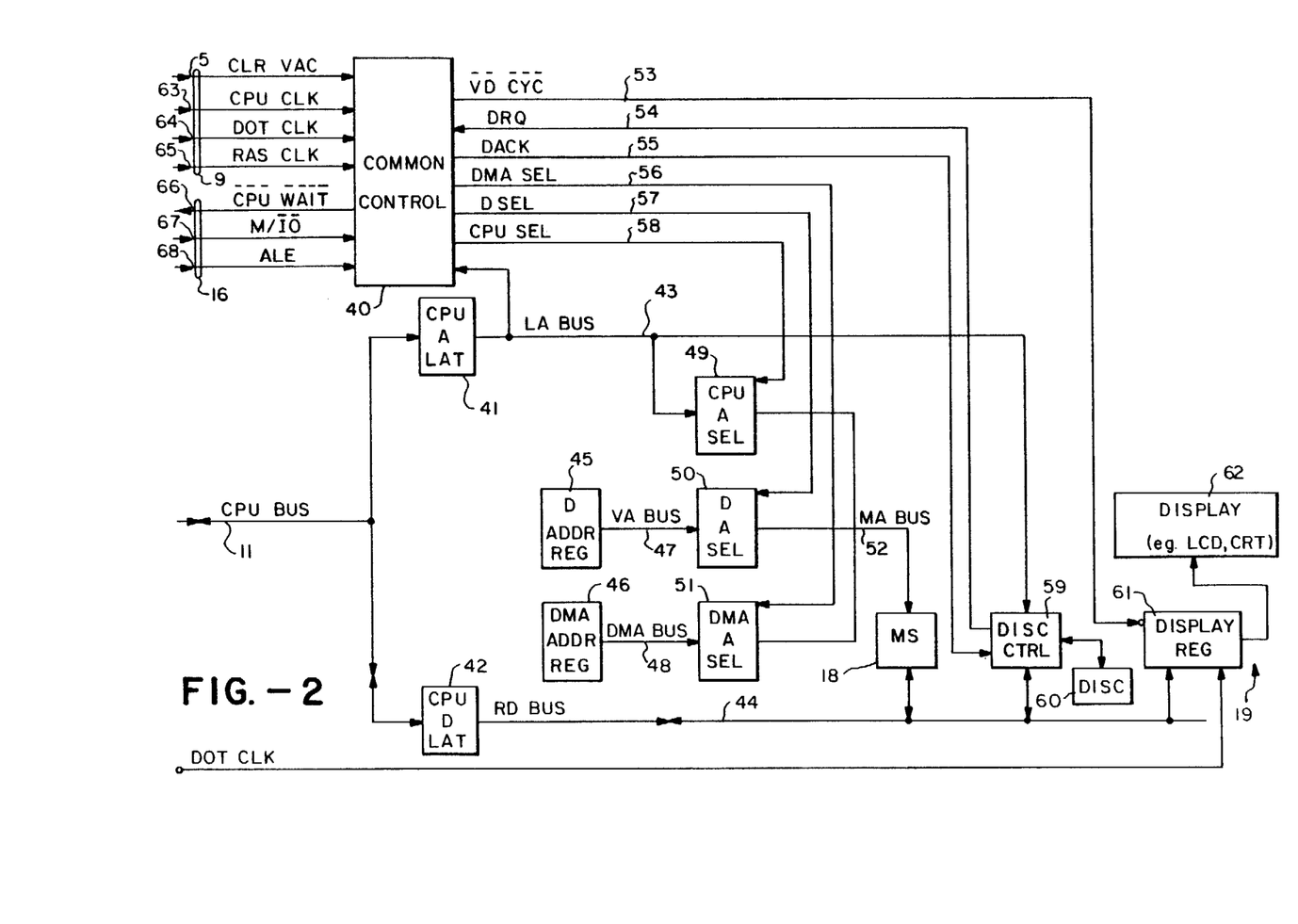
FIG. 2 depicts a schematic block diagram of the memory bus unit which forms a part of the FIG. 1 system.

Memory Bus Unit—FIG. 2

In FIG. 2, further details of the memory bus unit 17 of FIG. 1 are shown. The memory bus unit includes a main store 18, a display unit 19 which includes a display 62, which can either be a liquid crystal display (LCD) or a CRT device, and a display register 61. Periodically over a fixed cycle, information is transferred from a display region in the main store 18 to the display register 61 where it is displayed by display device 62.

In FIG. 2, the disk unit 20 includes a conventional disk controller 59 and a conventional disk unit 60. The disk unit 60 is typically a 5¼ inch floppy disk unit. Disk controller 59 operates to control transfers from and to the disk 60 to and from the RD bus 44. Bus 44 is a data bus which operates to transfer data to and from the CPU data latch 42. Also the bus 44 operates to transfer data to and from the main store 18. The address of an addressed location is supplied to the disk control 59 by the LA bus 43 which receives a data address from the CPU address latch 41. Accesses to the disk unit 60 via the disk controller 59 are initiated by a disk DMA request signal DRQ on line 54. Whenever the requested transfer is to be carried out, a disk DMA acknowledge signal DACK on line 55 is supplied to the disk controller 59. Transfers to and from the disk controller 59 over the bus 44 at addresses specified on bus 43 are carried out in a conventional manner. Whenever transfers involving the main store 18 occur, the main store address is selected by selection circuits 49, 50 and 51. The CPU address select circuit 49 selects addresses from the bus 43 when enabled by the CPU select signal on line 58. The display address select circuit 50 selects a display address from the display address register 45, on VA bus 47, whenever the DSEL signal on line 57 is asserted. The DMA address select circuit 51 selects addresses from the DMA address register 46, on DMA bus 48, under control of the DMA SEL signal on line 56.

The display 19 in FIG. 2 functions to store an output from main store 18 whenever the $\overline{VD}\ \overline{CYC}$ on line 53 is active. This signal is asserted whenever the display address is selected by the selection circuit 50. The selection circuits 49, 50 and 51 are each active at different times to select an address for the memory address (MA) bus 52. The location specified by the address on bus 52 is accessed in the main store 18 for reading or writing data from or to the RD data bus 44. When the display address is the one selected, the display location in main store 18 is accessed, and in the case of a read, the accessed data is stored into the display register 61. The display register 61 stores, in one example, six pixel values representing one dot-matrix line of a character for display on the display 62. The display 19, typically an LCD display, is controlled and operates in a conventional manner. The DOT CLK signal on line 64 is a clock signal which serially unloads the contents of register 61 for display in the display device 62.

In FIG. 2, the common control 40 is connected by lines 16 with a number of signal lines from and to the central processing unit 10 of FIG. 1. In one typical embodiment, the processor 10 of FIG. 1 is an Intel 80C86 microprocessor. The clock lines 9 are derived from the clock generator 15 of FIG. 1. The clock lines 9 include the CPU CLK signal on line 63, the DOT CLK signal on line 64, the RAS CLK signal on line 65. The CPU CLK signal is typically a 5 MHz signal, the DOT CLK signal is the CPU CLK signal divided by 4, and the RAS CLK signal is the CPU CLK signal divided by 2.

In the example where the processor 10 of FIG. 1 is an 80C86, the CPU bus 11 is a 16-bit bus which is utilized both for address and for data. The common control lines 16 include the $\overline{CPU}\ \overline{WAIT}$ signal line 66. The signal on line 66 connects to the ready (RDY) input of the processor 10. Whenever the signal on line 66 is a logical zero, it causes the processor 10 to stop processing and wait until the signal is switched to a logical one. The M/IO signal on line 67 is asserted whenever a main store memory access is to be asserted by the processor 10. The ALE signal on line 68 from the processor 10 is asserted by the processor whenever a CPU bus 11 cycle is to be commenced.

In the system of the present invention, data is organized into 16-bit words which are equal to 2 bytes. For a read or a write operation from the processor 10, four CPU cycles per word are required, that is, two cycles per byte. A bus cycle involves one word, that is 2 bytes and it is therefore four CPU clock cycles long. The operation of the processor 10 to read and write information from and to the latches 41 and 42 is carried out in a conventional manner. The manner in which communications over the memory bus unit 14 occurs is under control of the common control 40 of FIG. 2.

Figure 3:
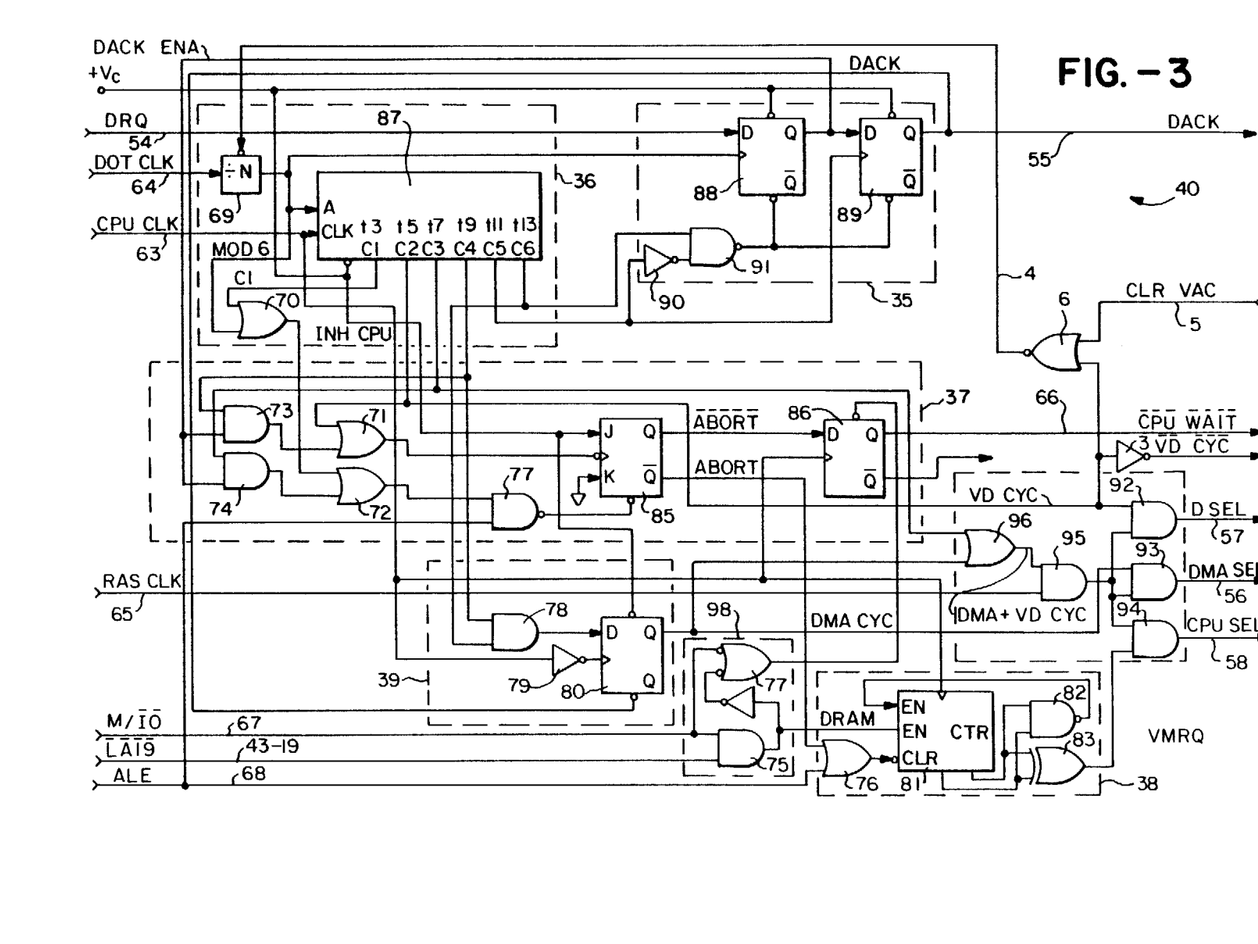
FIG. 3 depicts a schematic block diagram of the control circuitry which forms part of the memory unit of FIG. 2.

Common Control—FIG. 3

In FIG. 3, the common control 40 of FIG. 2 is shown in further detail.

In FIG. 3, the control includes the display cycle control circuitry 36, the disk request acknowledge circuitry 35, the contention circuitry 37, the memory request circuitry 38, and the DMA cycle store circuitry 39.

The request acknowledge circuitry 35 includes the D-type flip-flops 88 and 89. The flip-flop 88 stores a disk request signal whenever the DRQ line 54 is asserted and the MOD6 line is toggled. Whenever the flip-flop 88 stores a data request signal, that signal is passed to and stored in the flip-flop 89 when clocked by the C5 signal from the display controller circuitry 36. When the display cycle is occurring, and the flip-flop 89 stores a signal, the Q output from flip-flop 89 is the DMA acknowledge signal DACK on line 55. The signal on line 55 is one input to the contention circuitry 37 which will cause the $\overline{CPU}\ \overline{WAIT}$ signal on line 66 to be asserted. Each of the flip-flops 88 and 89 are reset to provide logical zero's on their Q outputs by operation of the NAND gate 91. Gate 91 is satisfied to clear the flip-flops 88 and 89 after the display cycle is completed as signaled by the C6 and C5 outputs from the display control 36.

In FIG. 3, the display control 36 includes a divide-by-N counter 69 which divides the DOT CLK signal on line 64 by N. In one example, N is six and represents the number of dots in one line of each character. Of course, N can be many different values. The output from the counter 69 is the MOD6 signal which is input to a shift register 87. The shift register 87 is stepped by the CPU CLK signal on line 63. The output from counter 69 represents the frequency with which a display cycle is undertaken to refresh the display 19 of FIGS. 1 and 2. Each time an output occurs from counter 69, the output is input to the shift register 87 and the shift register has the stage outputs C2, C3, . . . , C6 which function as timing signals for controlling various operations during and after each display cycle.

The OR gate 70 within display control 36 senses the C1 output from the shift register 87 or the MOD6 output from the divide circuit 69 to signal the contention circuit 37 that a display cycle has started.

In FIG. 3, the contention circuit 37 includes the OR gate 72 which receives the signal from the OR gate 70 to enable the NAND gate 77. If a display cycle, signalled by the gate 70 output of display control 36, has commenced at the time that the processor unit attempts to initiate a bus cycle, as indicated by a signal on the ALE line 68, the NAND gate 77 is satisfied to reset the JK-flip-flop 85. The Q output from flip-flop 85 is the ABORT signal which is clocked into the D-type flip-flop 86 on the next CPU CLK signal. The Q output from flip-flop 86 is the $\overline{\text{CPU WAIT}}$ signal on line 66 which causes the processor to wait until the display cycle is completed. The contention circuitry 37 functions to always give priority to the display control 36 and to cause the processor 10 to wait.

Whenever a DMA request occurs and a display cycle occurs so that a DMA acknowledge enable signal, DACK ENA, is provided on the Q output of the flip-flop 88 the AND gate 74 is enabled. At the C3 cycle time of the display shift register 87, gate 74 is satisfied to again, through the clear input to flip-flop 85 and the operation of NAND gate 77, hold the $\overline{\text{CPU WAIT}}$ signal on line 66. This operation extends the display cycle and permits flip-flop 85 to be clocked to provide a 1 on the Q output at the C4 time thus removing the wait signal to the processor. At the C4 and C6 active times from the shift register 87, the AND gate 78 is satisfied to provide an input to the flip-flop 80. That input is clocked through inverter 79 by the CPU CLK signal into flip-flop 80. If the DACK signal on line 55 had not been asserted, then the flip-flop 80 remains with a 1 on the Q output thereby asserting the DMA CYC signal. When the DACK signal is cleared to zero, the flip-flop 80 is also cleared indicating that the DMA cycle has occurred.

In FIG. 3, the memory request circuitry 38 is connected to receive a signal from AND gate 75. Gate 75 is part of decoder 98 which functions to decode the addresses contained within the main store 18. When the address bit $\overline{\text{LA19}}$ on line 43-19 is a logical zero and when $\overline{\text{LA19}}$ is a logical one, the addressed location is within the address space of memory 18. When the address is within the address range and the memory bus cycle signal, M/$\overline{\text{IO}}$ on line 67 is asserted, AND gate 75 is satisfied to provide the DRAM signal and enable the 2-bit counter 81. Counter 81, provided its other enable input from NAND gate 82 is satisfied, counts the CPU CLK signals. Counter 81 counts the CPU clock signals to specify a 2-clock memory cycle for a CPU memory request.

In FIG. 3, the gate 97 senses whenever the address is above 80000 (that is, $\overline{\text{LA19}}$ is 2) or an I/O operation is called for (M/$\overline{\text{IO}}$ is 2). Together gates 75 and 97 form decoder 98. When the output from gate 97 is a logical 1, flip-flop 86 is preset with a 1 on its Q output so that $\overline{\text{CPU WAIT}}$ is not asserted.

The OR gate 96 senses the C3 signal from the shift register 87 or the DMA CYC signal from the flip-flop 80 to enable the NAND gate 95 which in turn is satisfied by the next RAS CLK signal to enable each of the selection AND gates 92, 93 and 94.

Whenever the ALE signal on line 68 or the flip-flop 85 is cleared with a logical 1 on its Q output, the NOR gate 76 is satisfied to clear the flip-flop 84 to provide a logical 1 on its Q output.

The NAND gate 82 senses the end of a memory request cycle and disables one of the enable inputs to counter 81 causing it to stop counting at the end of the count.

Figure 4:
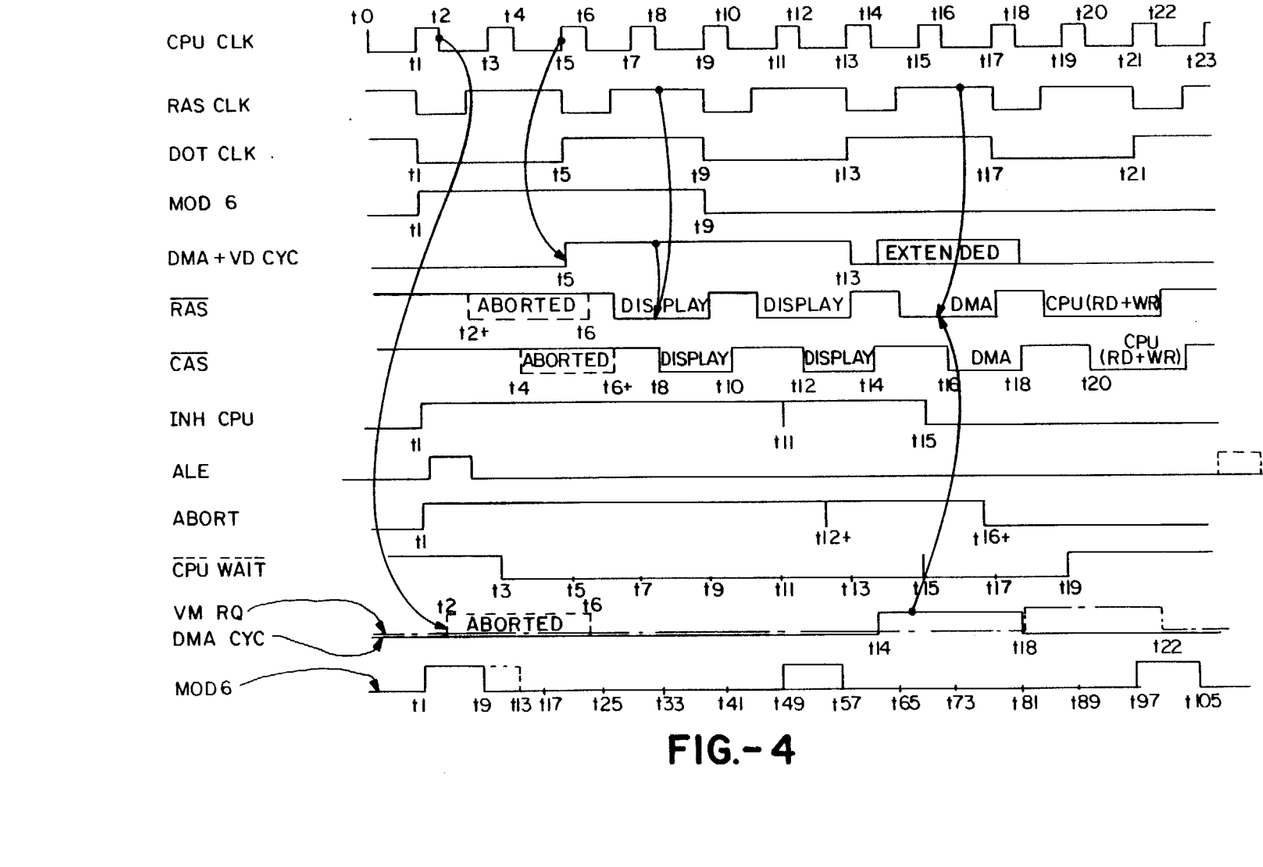
FIG. 4 depicts waveforms representative of the operation of the memory unit of FIG. 2.

Detailed Operation—FIGS. 3 & 4

The detailed operation of the present invention is described in connection with the waveforms of FIG. 4 and the common control of FIG. 3. In FIG. 3, operation is commenced by an output from the NOR Gate 6. Gate 6 provides an output whenever the CLR VAC signal is asserted on line 5. The signal on line 5 is derived from the clock unit 15 of FIG. 1. In one particular embodiment, the CLR VAC signal is derived by dividing the CPU CLK signal by 15360 in order to synchronize the timing of the display 62. Once synchronized by the CLR VAC signal, the NOR gate 6 has its output on line 4 asserted by the VD CYC signal which is the C2 output from the shift register 87 of FIG. 3. The signal on line 4 is asserted to preset the counter 69 to a binary count of 10, that is to 1010. Counter 69 is then counted to its full count of binary 1111 by the DOT CLK signal on line 64. When the full count is reached, Counter 69 provides a carryout signal on the next DOT CLK signal to provide a logical 1 or a logical 0 to the A data input of the shift register 87. The 1 or 0 output from the counter 69 is clocked through the shift register 87 by the CPU CLK signal.

In FIG. 4, the MOD 6 signal output from counter 69 goes from logical 0 to logical 1 at t1.

With the MOD 6 signal a logical 1, the OR gate 70 causes the INH CPU signal to become a logical 1 at t1 time as shown in FIG. 4. In FIG. 4 the MOD 6 signal is shown in two places with two different time scales. All of the waveforms in FIG. 4 have the same time scale except the MOD 6 waveform at the bottom of the page which has a condensed time frame running from t1 past t105. The MOD 6 waveform at the bottom of the page has been condensed by a factor of approximately 5 in order to show multiple display cycles.

In FIG. 4, it has been assumed for purposes of explanation that the CPU 10 attempts to obtain access to the memory bus 14 by asserting the ALE signal anytime after the t1 time. Since at t1 time, a display cycle is initiated which also requires access to the memory bus 14, a contention arises for access to the memory bus 14. The CPU 10 has lowest priority so that priority will be given to the display device. If the ALE signal had been asserted when no other device was seeking access to the memory bus 14, a memory request, signified by the VM RQ signal, would have resulted between t2 and t6 time. As shown in FIG. 4, however, the VM RQ signal is aborted between t2 and t6 time and actually becomes delayed until t18 to t22 time.

In FIG. 3, at time t1 the INH CPU signal from the OR gate 70 satisfies the OR gate 72 which in turn enables the NAND gate 77. Since the ALE signal on line 68, signifying a CPU memory request, has been asserted at this time (after t1) the NAND gate 77 is satisfied to assert the ABORT signal at t1 time. The ABORT signal through NOR gate 76 clears the counter 81 thereby holding the VM RQ signal as a logical 0 after t1 time.

In FIG. 3, the ABORT signal is clocked into the flip-flop 86 one cycle later at t3 time by the CPU CLK signal. As shown in FIG. 4, the $\overline{\text{CPU WAIT}}$ signal goes from a logical 1 to a logical 0 at t3 time in response to the ALE signal occurring at t1 time when INH CPU is active. The $\overline{\text{CPU WAIT}}$ signal causes the CPU 10 of FIG. 1 to wait to finish the CPU cycle until t20 time after $\overline{\text{CPU WAIT}}$ becomes nonasserted at t19 time.

In FIG. 4, at t1 time, the logical 1 for the MOD 6 signal is clocked into the shift register 87. The C1 output from shift register 87 becomes active at t3 time and the C2 output becomes active at t5 time. The C1 output continues to activate OR gate 70 and 72 to enable the NAND gate 77 which in turn holds flip-flop 85 cleared with a logical 0 on the Q output. At t5 time, the C2 output from shift register 87 provides the VD CYC signal which connects to the AND gate 92. Gate 92 enables the display address to be selected at the appropriate time determined by the RAS CLK signal. At t5 times the C2 output from shift register 87 also clocks the flip-flop 85 through OR gate 71, but at t5 time flip-flop 85 remains cleared by the operation of the NAND gate 77.

After the next negative-going transition of the DOT CLK signal at t9 time is input to the counter 69 of FIG. 3, the carry-out from the counter 69 is removed so that the output from counter 69 becomes a logical 0 at t9 time. The next CPU clock at t11 time causes the C1 output from the shift register to be a logical 0 which, through OR gates 70 and 72, disables the NAND gate 77 provided the AND gate 74 is not satisfied.

In FIG. 3 at t11 time, the AND gate 74 senses the DACK ENA signal from the flip-flop 88. At t1 time, a DMA request was pending as a result of a DRQ signal asserted on line 54 from disc controller 59 of FIG. 2, and flip-flop 88 is clocked at t1 time to store the DMA request and assert the DACK ENA signal. Since DACK ENA is asserted AND gate 74 is enabled. Therefore, at t13 time, NAND gate 77 holds flip-flop 85 cleared so that $\overline{CPU\ WAIT}$ is asserted with this operation, the DMA transfer becomes piggy-backed on top of the display cycle and no separate contention circuitry is required for resolving contentions between the CPU cycle, the display cycle and the DMA cycle.

The INH CPU signal is asserted until t11 in the absence of a DMA cycle and until t15 with a DMA cycle. Similarly, the ABORT signal remains asserted until t12 without DMA and until t16+ with DMA which is approximately two more CPU clock cycles for DMA. These two additional clock cycles allow for the DMA transfer.

After the t9 clock cycle, any DMA request stored in the flip-flop 88 is transferred by the C5 signal at the t11 time to the flip-flop 89. At t11 time, the DACK signal is asserted on line 55. When the C5 output from the shift register 87 clocks the flip-flop 89 at t11 time, the AND gate 73 becomes satisfied and provides a logical 1 through OR gate 71 to clock the flip-flop 85. At the t11 time, however, AND gate 74 and NAND 77 are still satisfied so that the flip-flop 85 is held in the cleared condition still asserting the ABORT signal. The next CPU CLK signal at t13 time provides the C6 output from the shift register 87. At this t13 time, AND gate 78 is satisfied and is available to clock a 1 into the flip-flop 80. Since the DACK signal is asserted, flip-flop 80 is not held cleared and the 1 is stored into flip-flop 80 at t13 time, thereby asserting the DMA CYC signal which in turn enables the AND gate 93. If the DACK signal had been asserted at the t13 time, the logical 0 on the Q output of flip-flop 89 would have held the flip-flop 80 cleared.

When the C3 output from the shift register 87 goes to a logical 0 after t15 time, the AND gate 74 is no longer satisfied and the NAND gate 77 becomes dissatisfied. On the next clock pulse at t17 time, C4 goes to 0 and AND gate 73 becomes dissatisfied thereby clocking the flip-flop 85 and the ABORT signal is no longer asserted. The next CPU CLK signal at t19 clocks the 1 from the Q output of flip-flop 85 into the flip-flop 86 so that $\overline{CPU\ WAIT}$ becomes a logical 1 and is no longer asserted. At this t18 time, the CPU gains priority and the VM RQ signal is asserted at t18 and a CPU read or write signal occurs starting at about t20 time. As shown in FIG. 4, the timing for the memory is controlled by the row address signal, $\overline{RAS}$ and the column address signal, $\overline{CAS}$. The memory access which would have occurred as a result of the ALE signal at t1 time did not occur as shown by the ABORTED indication in the $\overline{RAS}$ and the $\overline{CAS}$ signals from t2+ through t6 and t4 through t6+, respectively. Rather than a CPU access, a display access occurs from t8 to t16. Thereafter, a DMA access occurs between t16 and t20 followed by the CPU access after t20.

It is apparent that if no DMA request had been asserted and stored in the DMA request latch 88, then the DMA cycle between t16 and t20 (See $\overline{CAS}$ of FIG. 4) would not have occurred and the CPU cycle would have commenced at t16 time.

The $\overline{CPU\ WAIT}$ signal would have become inactive (logical 1) at t15 time, two CPU cycles earlier than t19 time. The operation is such that the DMA cycle, if requested, always occurs after the display cycle, which occurs between t8 and t16. With this operation, no contention needs to be resolved between DMA requests and CPU requests. Only a two way contention exists and that contention is between the CPU and the display requests. If there is a DMA request pending, then it is piggy-backed upon the display cycle after the display obtains priority for bus access. With the operation as described, priority is determined among three different devices (CPU, display and DMA) using only two-way contention circuitry. This operation greatly simplifies the contention circuitry. These savings in circuitry are important in making small, compact personal computers inexpensively. Referring to the compact waveform for the MOD 6 signal in FIG. 4, the display cycle is represented between t1 and t9, between t49 and t57 and between t97 and t105. The display period cycles is represented by the time from t1 to t49 and from t49 to t97, that is, 24 CPU CLK cycles. When the DMA is asserted, then the display cycle, for example, from t1 to t9 has the DMA cycle extended until t13. In the absence of a DMA request, the CPU can have access to the memory bus for the period represented by t9 to t49, that is, for 20 CPU CLK cycles. Whenever a DMA request is active, then the CPU may gain access for the period represented by t13 and t49, that is, for 18 CPU CLK cycles. Stated another way, the CPU has access 20/24 (5/6) of the time when no DMA is present and has access 18/24 (¾) of the time when a DMA access occurs.

In an embodiment where the display 19 of FIG. 1 utilizes a bit map memory attached to the memory bus, that memory can be updated with new information no less that ¾ of time with DMA and 5/6 of the time in the absence of any DMA transfers. Such an operation is important for maintaining a low cost display which can be updated rapidly. In the particular example described, the display has its display memory located in the main store 18 and that display can be updated rapidly (¾ of the time even with DMA).

While the invention has been particularly shown and described with reference to preferred embodiments thereof it will be understood by those skilled in the art that various changes inform and details may be made therein without departing from the spirit and scope of the invention.

What is claimed is:

1. A data processing system comprising,
a processor,
two or more system buses, including a memory bus,
in direct communication with said processor, random access memory means connected to said memory bus, wherein said memory bus comprises a memory address bus for addressing said memory means and a memory data bus for transferring data from and to said memory means, a first peripheral device, connected to said memory bus, for accessing said random access memory means over said memory bus, a second peripheral device, connected to said memory bus, for accessing said random access memory means over said memory bus, memory bus means having address means for addressing locations in said random access memory means, said address means including processor address means for selecting memory addresses for locations in said memory means associated with said processor, including first peripheral address means for selecting memory addresses for locations in said memory means associated with said first peripheral device, and including second peripheral address means for selecting memory addresses for locations in said memory means associated with said second peripheral device, wherein said memory bus means includes an address latch for latching said memory addresses from said processor, includes a data latch for latching data to be transferred between said processor and said memory means, and includes processor address selection means for selecting addresses from said address latch, wherein said first peripheral address means includes a first address register for providing said memory addresses and includes first address selection means for selecting address from said first address register, wherein second peripheral address means includes a second address register for providing said memory addresses and includes second address selection means for selecting addresses from said second address register, wherein said second peripheral device includes means for requesting a direct memory access, common control means for controlling said processor address means, said first peripheral address means, and said second peripheral address means to select and address for said memory bus to address said random access memory means, said common control including contention circuitry for resolving contentions for said memory bus among said processor, said first peripheral device and said second peripheral device, wherein said common control means includes means for arbitrating between said processor address means said first peripheral address means and said second peripheral address means, includes contention means for periodically granting priority to said first peripheral device, and includes means for granting priority to said second peripheral device whenever both said direct memory access is requested and priority has been granted to said first peripheral device.

2. The system of claim 1 wherein said system includes additional memory units connected to system buses other than said memory bus, said memory units having address locations which are in an address range different from the address range of address locations in said random access memory, said common control means including decoder means for sensing processor addresses specified by said processor, said decoder means including means for enabling a processor wait signal whenever the processor address is within the address range of said random access memory and said first or second peripheral device has priority to access said memory bus.

3. The system of claim 1 wherein said memory means has a first address range and wherein said system further includes additional memory, connected to another one of said system buses other than said memory bus, said additional memory having a second address range, said common control including address decoder means for sensing when memory addresses from said processor are in said first address range and including means for generating a processor wait signal when said memory address is within said first address range and for not generating a processor wait signal when said memory address is within said second address range.

4. A data processing system comprising, a processor, a memory bus, connected to said processor, random access memory means connected to said memory bus, said random access memory means includes memory display locations, a display device connected to said memory bus, for accessing said random access memory means over said memory bus to display information stored in said memory means, a direct memory access storage device, connected to said memory bus, for accessing said random access memory means over said memory bus, said storage device includes means for requesting a direct memory access, memory bus means having a processor address means for selecting memory addresses specified by said processor, including display address means for selecting memory addresses specified for said display device, and including storage address means for selecting memory addresses specified for said storage device, common control means for controlling said processor address means, said display address means and said storage address means to select an address for said memory bus to address said random access memory means, said common control means includes:

means for providing a direct memory access cycle for transferring data between said memory means and said storage device over said memory bus in response to the request from said storage device, means for providing a periodic display cycle for periodically transferring data over said memory bus from said memory display locations to said display device for display at display locations of said display device, and contention circuitry for resolving contentions for said memory bus among said processor, said display device and said storage device, including:

means for sensing whenever said periodic display cycle is active and for inhibiting access by said processor to said memory bus during said display cycle whereby access priority is granted to said display device, request means for storing the direct memory access request from said storage device, and means for granting priority to said storage device whenever both said display device acquires priority for said memory bus and a direct memory whereby access by said processor to said memory bus is inhibited both for said display cycle and for said direct memory access cycle, and one or more additional devices connected to said processor over one or more additional buses, said processor operative to access said additional devices at times when said memory means is connected to said memory bus for access between one of said display device and said storage device.

5. The system of claim 4 wherein said memory means has a first address range and wherein said system further includes additional memory, connected to said processor by another bus other than said memory bus, said additional memory having a second address range, said common control including address decoder means for sensing when memory addresses from said processor are in said first address range and including means for generating a processor wait signal when said memory address is within said first address range and not hen said memory address is within said second address range.

* * * * *